Figure 1:
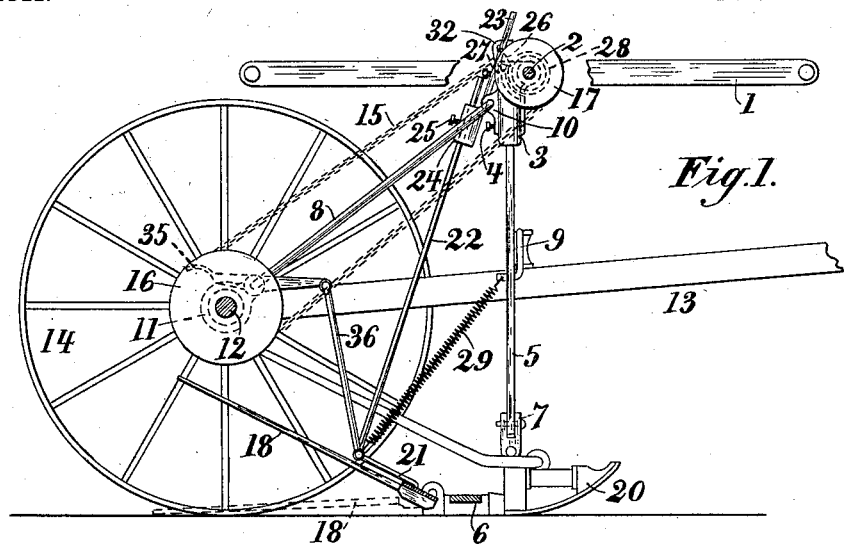

No. 763,712. PATENTED JUNE 28, 1904.
J. BERGLUND.
REAPING MACHINE.
APPLICATION FILED JULY 28, 1903.
NO MODEL. 2 SHEETS—SHEET 1.

Witnesses.
Evald Delmar
Einar Gjelertsen

Inventor.
John Berglund
by Oro Dahl
his Attorney.

No. 763,712. PATENTED JUNE 28, 1904.
J. BERGLUND.
REAPING MACHINE.
APPLICATION FILED JULY 28, 1903.
NO MODEL. 2 SHEETS—SHEET 2.

Witnesses.
Evald Dilmar
Einar G. Petersen

Inventor.
John Berglund
by Oerftahl
his Attorney.

No. 763,712. Patented June 28, 1904.

UNITED STATES PATENT OFFICE.

JOHN BERGLUND, OF ARVIKA, SWEDEN.

REAPING-MACHINE.

SPECIFICATION forming part of Letters Patent No. 763,712, dated June 28, 1904.

Application filed July 28, 1903. Serial No. 167,363. (No model.)

*To all whom it may concern:*

Be it known that I, JOHN BERGLUND, a subject of the King of Sweden and Norway, and a resident of Arvika, Sweden, have invented new and useful Improvements in Reaping-Machines, of which the following is a specification, reference being had to the drawings accompanying and forming a part hereof.

This invention relates to improvements in reaping-machines having dropping attachments.

The invention comprises a mechanism which is adapted to release the dropper at predetermined intervals for delivering the grain on the ground, the said mechanism consisting of a rod or the like adapted to hold the dropping attachment in its upper position, a support against which the said rod is adapted to bear, and a rotating screw-spindle adapted to move the said rod from the support for automatically releasing the dropper after a predetermined forward movement of the reaping-machine, so that the dropper will swing down on account of the weight of the grain accumulated on the same, and thereby deliver the said grain on the ground.

The invention further consists in the combinations and arrangements of parts hereinafter described and claimed.

In the drawings a reaping-machine is shown provided with automatic dropper constructed in accordance with this invention.

Figure 2:
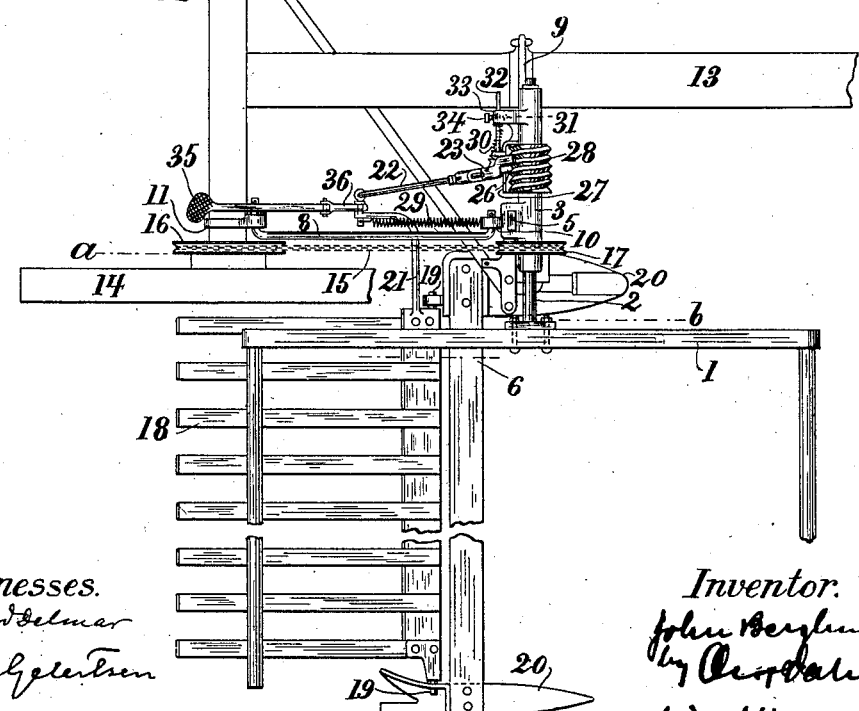
Figure 3:
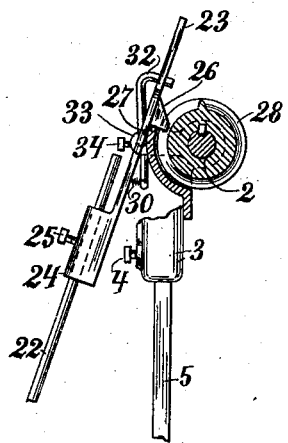
Figure 4:
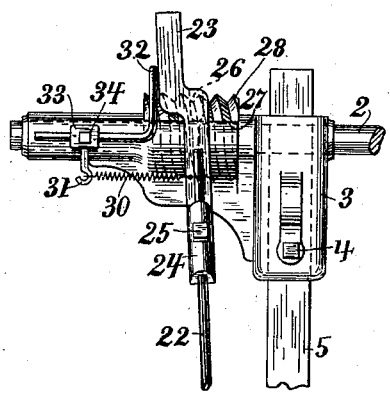

Figure 1 is a side view of the machine, partly in section, on the line *a b* of Fig. 2, and Fig. 2 is a plan view of the same. Fig. 3 is a cross-section, and Fig. 4 is a side view on a larger scale, of the mechanism which controls the time at which the dropper is lowered and the grain delivered.

My invention may be applied to all types of reaping-machines provided with dropper. In the drawings the invention is shown applied to a reaping-machine the reel 1 of which has its shaft 2 journaled in a bearing 3, adjustably fixed, by means of a screw 4, on an upright 5. The said upright is connected with the frame 6 of the machine by means of a universal joint 7, Fig. 1, and is held in position by means of two stays 8 and 9, the one, 8, connected with a lug 10 on the bearing 3 and a ring 11 on the shaft 12 of the machine and the other, 9, connected with the upright 5 and the pole 13, as shown. The reel 1 is driven by one of the wheels 14 of the machine by means of a chain 15 or the like and pulleys 16 17.

18 is the dropper, which is, by means of pins 19 19, journaled in the frame 6, supported on runners 20 20 in the usual manner. An arm 21 is fixed to the dropper, and a link 22 23 is connected with the said arm, which link in order to be adjusted in its length to the position of the journal 3 on the upright 5 consists of two parts. The upper part, 23, which embraces the lower one, 22, by means of a socket 24, is fixed to the same in suitable position by means of a screw 25, Figs. 3 and 4, and is provided with a nose or projection 26, sliding on a rib or shelf 27 on the bearing 3 when the dropper 18 is in its upper position, as shown in Fig. 1. Thus the parts 22, 23, and 26 form a hook-shaped link which carries the dropper while grain is being gathered on the same. The said shelf is parallel to the shaft 2 of the reel, and the nose 26 projects into the space between the threads of a screw-spindle 28, fixed on the shaft 2. When the shaft 2 and the screw-spindle 28 are rotated, the hook-shaped link 22 23 26 is moved toward the right, Fig. 4, until the nose 26 arrives at the right end of the shelf, Fig. 4, when the link will drop. While the link is being moved to the said end grain will be gathered on the dropper 18 in such a large quantity that as the link leaves the shelf the weight of the grain can lower the dropper, overcoming the tension of a spring 29, connected with the arm 21 and the upright 5. The dropper is thus swung downward into the position shown by dotted lines in Fig. 1, in which position the stubble entering the spaces in the rake sweeps off the grain. The spring 29 will then raise the dropper into the position shown by full lines. When the hook-shaped link drops from the shelf, its top part, which is bent to some extent toward the left, Fig. 4, bears against the rear of the shelf, thus guiding the link. As soon as the said link has left the shelf it is moved toward the left, Fig. 4, by a spring 30, connected with the link 22 23 and a hook 31 or the like fixed to the bearing 3. The said movement is limited by an angular rod 32, adjustably fixed, by means of a screw 34, in a lug 33, projecting from the bearing 3, said rod forming an abutment for the link. As the dropper 18 and the link 22 23 are raised after the grain is removed from the former the link will again have its nose 26 placed upon the shelf 27, acted upon by its own weight and by the spring 30, which has an oblique direction from the link toward the bearing 3. During this movement the nose enters the space between the threads of the screw-spindle, which is opposite the same, and in this manner the hook-shaped link is returned to its initial position. The operations of the machine stated above are then repeated, so that a new quantity of grain assembled on the dropper is delivered on the ground. The way that the reaping-machine has to be moved for each releasement of the dropper can be adjusted exactly by means of the rod 32. Thus if the said rod is fixed in its extreme left position, Fig. 4, the link 22 23 must pass along the whole screw-spindle 28 before the hook can drop and grain is delivered by the dropper. The said position of the rod 32 is suitable when thin grain is to be mowed. The more the rod 32 is moved to the right the fewer screw-threads the hook has to pass and the shorter distances the reaping-machine has to be moved for each delivering of grain by the dropper. Thus it will be seen that the operation can be adopted to any quantity of grain to be delivered. The function of the mechanism or the delivering operation is in no respect dependent on the condition of the ground—*i. e.*, if the ground is flat or uneven the said delivering operations will always take place in accordance with the adjustment of the mechanism. The spring 29 only serves to raise the dropper after the delivering is performed; but the time at which the delivering operation takes place is in no respect dependent on the said spring. If the grain is very unequal, so that the proper quantity of grain is delivered at one place, but too small a quantity is delivered at another place, this disadvantage is removed by means of a treadle 35, swinging on the end of the stay 8 and connected, by means of a link 36, with the arm 21. By pressing down the said treadle the nose 26 is raised out of engagement with the screw-spindle 28, and in this manner the mechanism is rendered inactive until the treadle is released. The delivering operation will then again take place.

By means of the mechanism described above the delivering operation will generally be uniform and bundles of the same size obtained without any special attention of the driver to the said operation. The construction of the mechanism and its parts for attaining the said object may obviously be modified in many ways without departing from the essential spirit of the invention.

What I claim as my invention, and desire to secure by Letters Patent, is—

1. The combination with a reaping-machine having a dropping attachment of, a rod holding the dropper in its upper position, a support against which the said rod bears, and a rotating screw-spindle adapted to move the said rod from the support, substantially as and for the purpose set forth.

2. The combination with a reaping-machine having a dropping attachment, of a shelf, a hook-shaped link adapted to slide with its hook on the said shelf and to hold the dropper in its raised position, a rotating screw-spindle adapted to act upon the said hook and move the same toward the end of the shelf, and a spring adapted to raise the dropper after the grain is delivered on the ground, substantially as and for the purpose set forth.

3. The combination with a reaping-machine having a dropping attachment, of a shelf, a hook-shaped link adapted to slide with its hook on the said shelf and to hold the dropper in its raised position, a rotating screw-spindle, adapted to act upon the said hook and move the same toward the end of the said shelf, a spring adapted to raise the dropper after the grain is delivered on the ground, a return-spring adapted to act upon the said link, and an abutment for the link adapted to determine the initial position of the latter, substantially as and for the purpose set forth.

4. The combination with a reaping-machine having a dropping attachment of, a shelf, a hook-shaped link adapted to slide with its hook on the said shelf and to hold the dropper in its raised position, a rotating screw-spindle adapted to act upon the said hook and move the same toward the end of the said shelf, a spring adapted to raise the dropper after the grain is delivered on the ground, a return-spring adapted to act upon the said link, an adjustable abutment for the link adapted to determine the initial position of the latter, and a lever adapted to bring the hook-shaped link out of engagement with the said screw-spindle, substantially as and for the purpose set forth.

In testimony whereof I have signed my name to this specification in presence of two subscribing witnesses.

JOHN BERGLUND.

Witnesses:
 JOHAN ELOF CALAIS,
 FRANS JOHANSSON.